US012670287B2

(12) United States Patent
Duval

(10) Patent No.: US 12,670,287 B2
(45) Date of Patent: Jun. 30, 2026

(54) SESSION ACCESS TO FILES IN A FILE SYSTEM MOUNTED IN A SECURE MEMORY DEVICE

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 158 days.

(21) Appl. No.: 17/849,133

(22) Filed: Jun. 24, 2022

(65) Prior Publication Data

US 2023/0057638 A1      Feb. 23, 2023

Related U.S. Application Data

(60) Provisional application No. 63/233,843, filed on Aug. 17, 2021.

(51) Int. Cl.
*G06F 21/62* (2013.01)

(52) U.S. Cl.
CPC .............................. *G06F 21/6227* (2013.01)

(58) Field of Classification Search
CPC .................................................. G06F 21/6227
See application file for complete search history.

(56) References Cited

U.S. PATENT DOCUMENTS

| | | | | |
|---|---|---|---|---|
| 7,603,533 | B1 * | 10/2009 | Tsypliaev | G06F 21/575 |
| | | | | 711/158 |
| 7,953,948 | B1 * | 5/2011 | Dyatlov | G06F 11/1435 |
| | | | | 711/158 |
| 8,069,320 | B1 * | 11/2011 | Per | G06F 11/1451 |
| | | | | 707/646 |
| 8,799,903 | B1 * | 8/2014 | Talwar | G06F 9/5094 |
| | | | | 718/100 |
| 9,213,866 | B1 * | 12/2015 | Ahmad | G06F 21/76 |
| 9,628,146 | B2 * | 4/2017 | Van Nieuwenhuyze | |
| | | | | G06K 7/10237 |
| 11,288,237 | B2 * | 3/2022 | Karampuri | G06F 16/172 |
| 2002/0062447 | A1 * | 5/2002 | King | G06K 13/085 |
| | | | | 726/4 |
| 2008/0163368 | A1 * | 7/2008 | Harris | G06F 21/84 |
| | | | | 726/21 |
| 2015/0269025 | A1 * | 9/2015 | Krishnamurthy | G06F 11/1092 |
| | | | | 714/6.24 |
| 2015/0277762 | A1 * | 10/2015 | Guo | G06F 3/0653 |
| | | | | 711/154 |
| 2019/0238312 | A1 * | 8/2019 | Dickens, III | G06F 3/0673 |
| 2022/0156747 | A1 * | 5/2022 | Kumawat | G06Q 20/35765 |

* cited by examiner

*Primary Examiner* — Yonas A Bayou
(74) *Attorney, Agent, or Firm* — Greenberg Traurig

(57) ABSTRACT

Session access to files in a file system mounted in a secure memory region in a secure memory device. In response to a request from an application to open a session for the file system to access the memory region, a secure command is sent to the memory device to install an access control key for the memory region. After storing a session key in a key repository, the application can call the operating system to access files in the file system. In response, the file system can generate access commands to be transmitted to the memory device. The session key stored in the key repository can be used to sign the access commands on behalf of the application. The memory device uses the access control key to validate the access commands signed using the session key prior to the execution of the access commands.

20 Claims, 7 Drawing Sheets

Mount a file system into a memory region in a memory device  301

Receive a request from an application to open a session for the file system to access the memory region  303

Transmit, to the memory device, a secure command for the session to instruct the memory device to install an access control key for the memory region  305

Store, into a key repository, a session key  307

Receive, in an operating system, calls from the application to access files in the file system mounted in the memory region  309

Generate, by the file system and responsive to the calls, access commands to be transmitted to the memory device to access the memory region  311

Receive, from the file system and during the session, the access commands  313

Communicate with the key repository to generate, using the session key, verification codes for the access commands  315

Transmit the access commands with the verification codes to the memory device  317

Validate, by the memory device using the access control key and prior to execution of the access commands, the verification codes generated from the session key for the access commands  319

FIG. 5

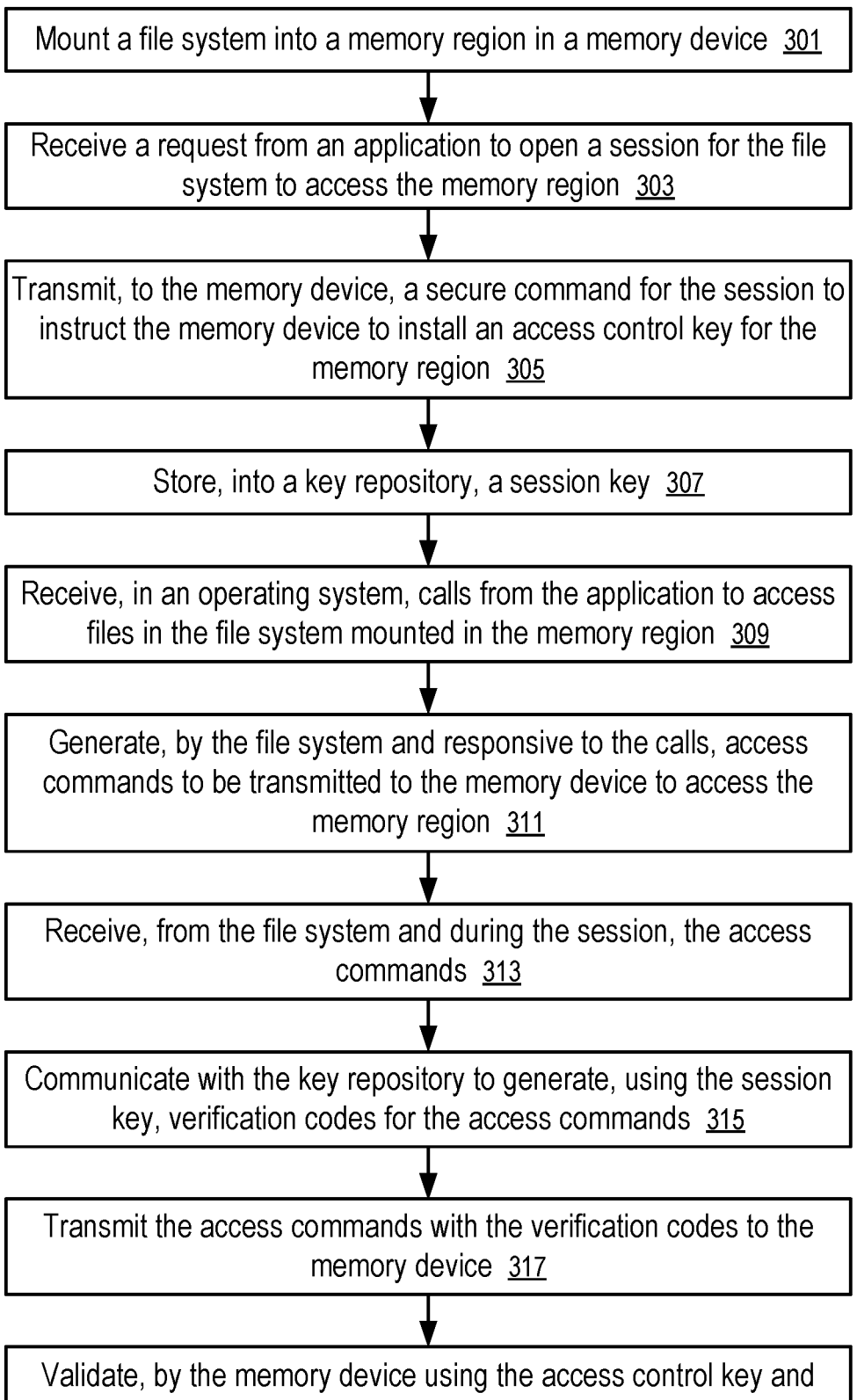

SESSION ACCESS TO FILES IN A FILE SYSTEM MOUNTED IN A SECURE MEMORY DEVICE

RELATED APPLICATIONS

The present application claims priority to Prov. U.S. Pat. App. Ser. No. 63/233,843 filed Aug. 17, 2021, the entire disclosures of which application are hereby incorporated herein by reference.

TECHNICAL FIELD

At least some embodiments disclosed herein relate to access control in general, and more particularly, but not limited to writing files into a file system mounted in a secure memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 5 shows a method of accessing files in a secure memory device according to one embodiment.

DETAILED DESCRIPTION

Figure 1:
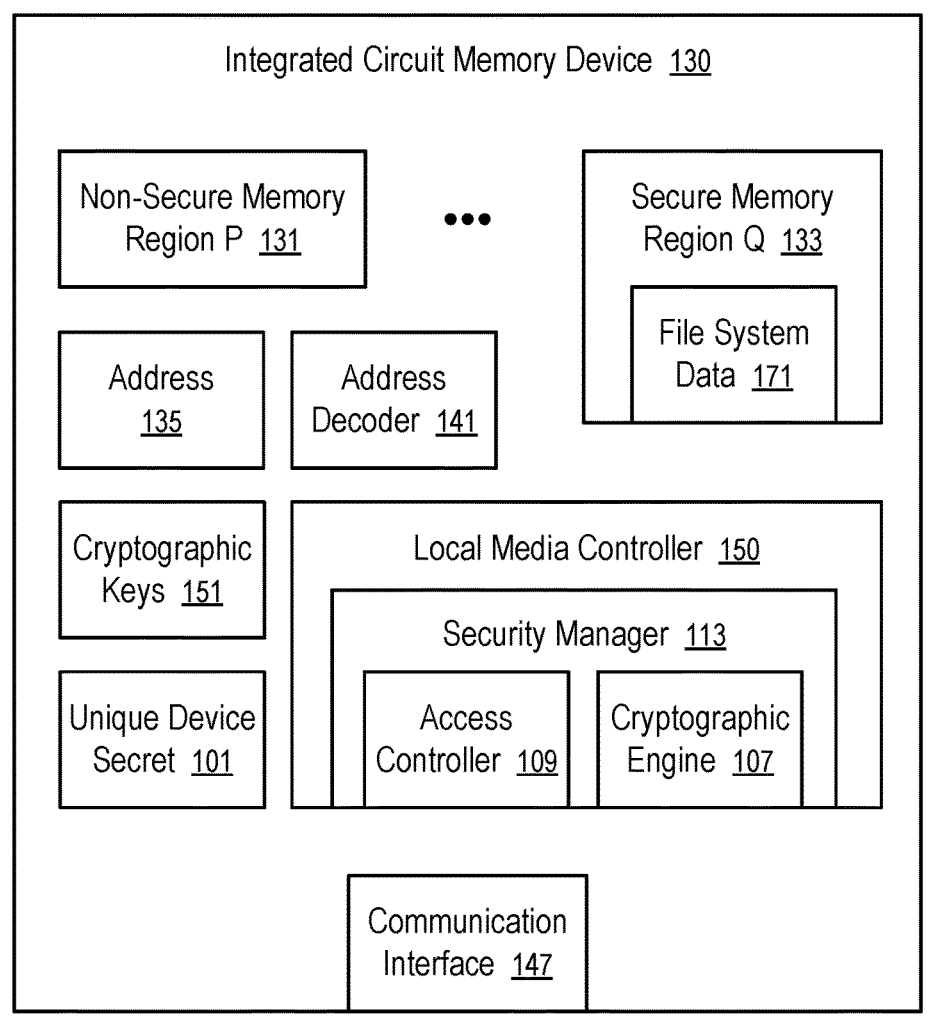
FIG. 1 illustrates an integrated circuit memory device having a security manager according to one embodiment.

At least some aspects of the present disclosure are directed to a security manager configured to establish and terminate a session for an application. During the session, the application can interact with a file system mounted in a secure section of a secure memory sub-system in a same way as accessing files in a non-secure secure and/or a non-secure memory sub-system. Examples of storage devices and memory modules as memory sub-systems are described below in conjunction with FIG. 6. In general, a host system can utilize a memory sub-system that includes one or more components, such as memory devices that store data. The host system can provide data to be stored at the memory sub-system and can request data to be retrieved from the memory sub-system.

A secure memory device can require a command to be signed using a cryptographic key before the command is executed to access a secure memory region. The cryptographic key is representative of the privilege to access the secure memory region.

When a file system is mounted in a secure memory region of the secure memory device, it can be a challenge to allow applications having access to the file system to access the secure section of the memory device. For example, at the time of an application calling the operating system to write a file, the storage location within the secure section of the memory device may yet to be determined for writing the data of the file. Thus, even if the application has a cryptographic key representative of the privilege to access the secure memory region, the application cannot create, at the time of issuing calls to the operating system, a signed command executable to access the storage location that is to be determined after the call.

At least some aspects of the present disclosure address the above and other deficiencies and/or challenges by a security manager communicating with a secure memory device to create a session, during which the security manager can use, on behalf of an authorized entity, a session key representative of the privilege to access a secure section of memory region to sign commands generated by the file system. The session key is stored in a key repository during the session to allow the security manager to sign commands to access the secure section. As a result, an authorized application can interact with a file system during the session to access files in a same way as accessing files in a non-secure section and/or a non-secure memory device. When the security manager receives storage access commands from the file system, the security manager determines whether the commands are configured to access a secure section of a secure memory device; if so, the security manager uses the session key in the key repository to sign the commands and transmits the signed commands to the secure memory device for execution. To terminate the session, the application and/or the security manager can revoke the session key in the key repository and in the secure memory device.

For example, the security manager can be implemented via a direct access driver, a storage stack driver, and a key repository. An application having the privilege to access the secure section in a secure memory device can request the direct access driver to establish a session for the application. The direct access driver is configured to convey secure commands, previously signed with a cryptographic key to the secure storage device, such as a command to establish a session key to grant privilege to access the secure section. After the privilege of the session key is configured via the direct access driver and the session key is stored in the key repository, the application can call the operating system running in the host system to access files in the file system mounted in the secure section. The storage stack driver can be implemented via a device driver of the secure memory device. When the storage stack driver receives commands from the file system to access the secure memory device, the storage stack driver can determine whether the data locations accessed by the commands are in the secure section; and if so, the session key stored in the key repository in association with the secure section can be used to sign the received commands for transmission to the secure memory device.

Optionally, after the session is created, the application can request the file system to identify the storage locations of one or more files and then request the direct access driver to compute a cryptographic measure of the data/content at the locations. For example, a cryptographic hash function can be applied to the data/content to generate a hash value representative of the current state of the one or more files. Before or after the session is closed or terminated, the application can again request the current storage locations of the one or more files and then request the direct access driver to compute a current cryptographic measure of the data/content at the locations. The current measure can be compared to a previous measure to detect an unexpected change, which can be an indication of a security attack.

FIG. 1 illustrates an integrated circuit memory device having a security manager according to one embodiment. For example, a file system managed by an operating system running in a host system can be mounted in a secure memory region 133 in the memory device of FIG. 1 to store file system data 171.

The integrated circuit memory device 130 can be enclosed in a single integrated circuit package. The integrated circuit memory device 130 includes multiple memory regions 131, . . . , 133 that can be formed in one or more integrated circuit dies.

A memory region (e.g., 131 or 133) can be allocated for use by a host system as a partition, a logical unit, or a namespace. Memory locations in the memory region (e.g., 131 or 133) can be specified by the host system via an address of Logical Block Addressing (LBA); and the memory device 130 can include an address map that specifies the relation between LBA addresses in a partition, logical unit, or namespace and physical addresses of corresponding memory cells used to provide the storage space allocated to the partition, logical unit, or namespace. In some implementations, the memory device 130 is configured in a memory sub-system (e.g., 110 illustrated in FIG. 6); and a memory sub-system controller 115 can be configured to perform the address mapping for the memory device 130.

A typical memory cell in a memory region (e.g., 131, . . . , 133) can be programmed to store one or more bits of data.

The memory device 130 has a local media controller 150, which can implement at least a portion of a security manager 113.

The security manager 113 of the memory device 130 can include an access controller 109 and a cryptographic engine 107.

The cryptographic engine 107 can be implemented via a logic circuit and/or instructions or microcode to perform cryptographic calculations, such as applying a cryptographic hash function to a data item to generate a hash value, encrypting a date item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

The access controller 109 controls access to at least one of the memory regions 131, . . . , 133 and/or other functions of the memory device 130 based on cryptographic keys that are representative of access privileges.

For example, the security manager 113 can control access to a secure memory region 133 based on a cryptographic key that is generated based on a secret 101 of the integrated circuit memory device 130 and/or a cryptographic key representative of an owner or an authorized user of the memory device 130. For example, when a request or command to write data into the secure memory region 133 is received in the integrated circuit memory device 130, the security manager 113 verifies whether the request is from a requester having the cryptographic key. If not, the security manager 113 may reject the write request. To demonstrate that the request is from an authorized requester, the requester can digitally sign the request, or a challenge message, using the cryptographic key. When the security memory device 130 determines that the digital signature is made using the correct cryptographic key, the requester is seen to have the permission to write the data into the secure memory region 133. For example, the memory device 130 can store one or more cryptographic keys 151 that are used to authenticate the digital signature of the signed request/command.

The memory device 130 can be configured to use different cryptographic keys 151 to access control different commands. For example, one cryptographic key 151 can be representative of the privilege to have a secure command executed in the memory device 130; and the secure command is used to specify that another cryptographic key 151 is representative of the privilege to read and/or write in a secure memory region 133. For example, the memory device 130 can have multiple secure memory regions (e.g., 133); and access to each of the secure memory regions (e.g., 133) can be controlled via a separate cryptographic key 151.

For example, the memory device 130 can have a unique device secret 101 that represents an identity of the memory device 130; and a cryptographic key 151 derived from the unique device secret 101 can be representative of an owner privilege to operate the memory device 130 and thus have secure commands executed in the memory device.

In general, the secure memory region 133 can have different security requirements for different types of accesses (e.g., read, write, erase). For example, the secure memory region 133 can be configured to require digital signatures verifiable via the cryptographic key 151 to write or change data in the secure memory region 133 but does not require a signed command to read the data from the secure memory region 133. Alternatively, the secure memory region 133 can be configured to require digital signatures verifiable via the cryptographic key 151 to read, write, and/or change data in the secure memory region 133. Alternatively, the secure memory region 133 can be configured to require digital signatures verifiable via different cryptographic keys for different operations, such as read, write, change, erase, etc., in the secure memory region 133.

A computing system can mount a file system in the secure memory region 133, such that the file system data 171 used to organize files and/or contents of files in the file system is stored within the secure memory region 133. Access to the file system data 171 stored in the secure memory region 133 can require commands/requests signed using a cryptographic key 151 associated with the access control of the secure memory region 133.

Optionally, the computing system can mount another file system in the non-secure memory region 131. Access to the files in the non-secure memory region 131 does not require a command signed using a cryptographic key.

The integrated circuit memory device 130 has a communication interface 147 to receive a command having an address 135. In response to the address 135 identifying a secure memory region (e.g., 133) that is configured with access control, the security manager 113 uses the cryptographic engine 107 to perform cryptographic operations for the verification that the request is from a requester having the cryptographic key authorized for the access to the memory region 133, before providing memory data retrieved from the memory region 133 using an address decoder 141. The address decoder 141 of the integrated circuit memory device 130 converts the address 135 into control signals to select a group of memory cells in the integrated circuit memory device 130; and the local media controller 150 of the integrated circuit memory device 130 performs operations to determine the memory data stored in the memory cells at the address 135.

Figure 2:
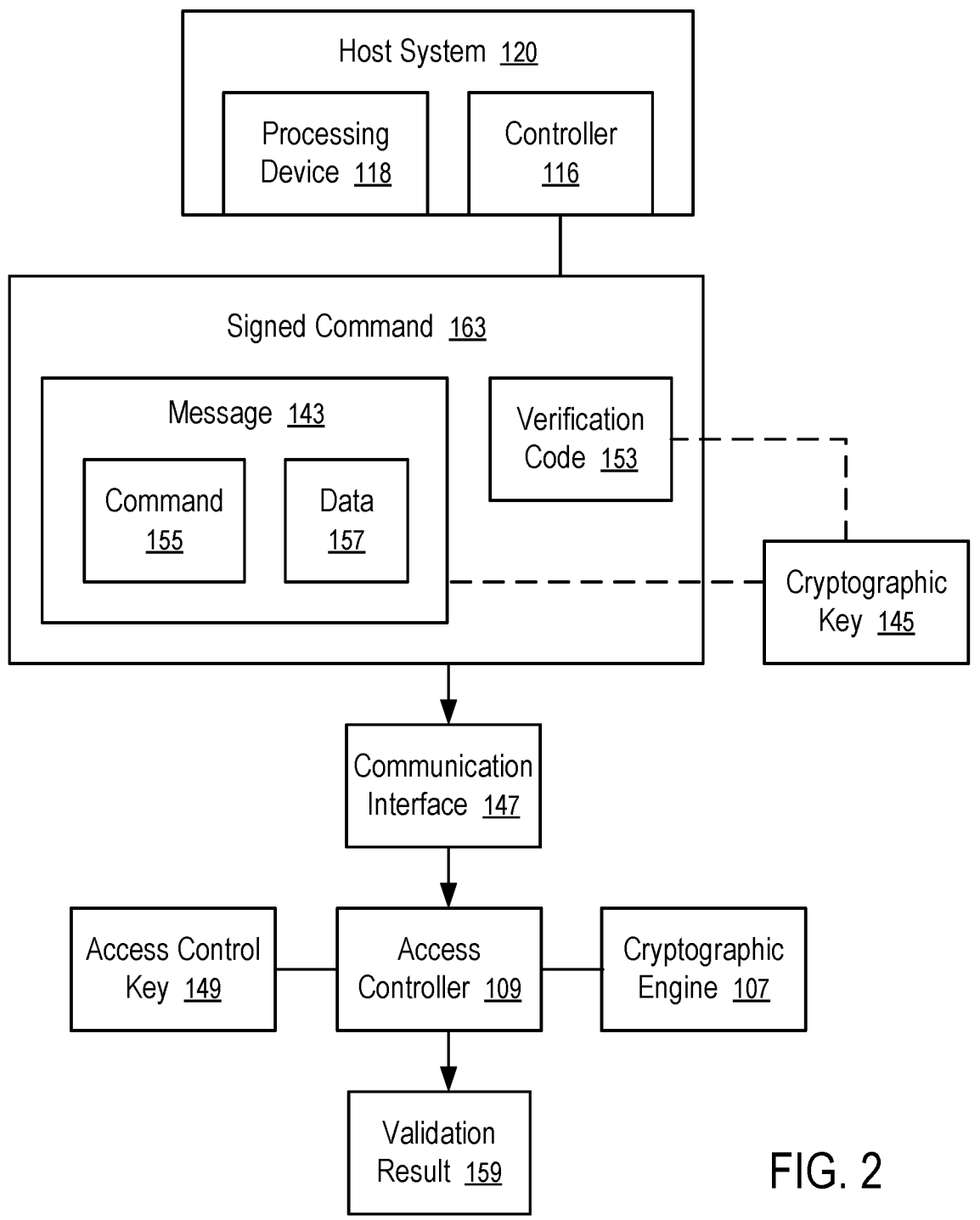
FIG. 2 illustrates a technique to control execution of a command in a memory device according to one embodiment.

FIG. 2 illustrates a technique to control execution of a command in a memory device according to one embodiment. For example, the technique of FIG. 2 can be implemented in the memory device 130 of FIG. 1.

In FIG. 2, the access controller 109 is configured with an access control key 149 to determine whether a signed command 163 received in the communication interface 147 is from an entity having the privilege to have the command 155 executed in the secure memory device 130.

When a controller 116 of a host system 120 sends a command 155 to the communication interface 147 of the memory device 130, the access controller 109 determines whether the sender of the command 155 has the privilege to request the memory device 130 to execute the command 155. The host system 120 can include one or more processing devices 118 that execute instructions implementing an operating system and/or application programs.

A cryptographic key 145 is configured to represent the privilege that is to be checked using the access control key 149. A sender of the command 155 can generate a verification code 153 from the cryptographic key 145 and a message 143 containing the command 155.

The verification code 153 of the cryptographic key 145 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation.

In general, verifying whether a sender of a message (e.g., 143) has a cryptographic key (e.g., 145) involves the validation of a verification code (e.g., 153) of the message (e.g., 143). The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternatively, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-bashed message authentication code.

For convenience, a verification code (e.g., 153) generated for a message (e.g., 143) using a cryptographic key (e.g., 145) to represent both the message (e.g., 143) and the cryptographic key (e.g., 145) can be referred to, generally, as a digital signature of the message (e.g., 143) signed using the cryptographic key (e.g., 145), with the understanding that the verification code can be generated using various techniques, such as hash-based message authentication code.

In FIG. 2, the access controller 109 uses a corresponding access control key 149 to validate the verification code 153 submitted to the communication interface 147 for the command 155. The access controller 109 uses the cryptographic engine 107 to generate a validation result 159 of the received message 143 and the received verification code 153. Based on the validation result 159, the access controller 109 can selectively allow the command 155 to be executed within the memory device 130 or block the execution of the command 155.

For example, the access control key 149 can be one of the cryptographic keys 151 stored in the memory device 130. Different access control keys can be used to control different privileges for executing different commands and/or for executing a command operating on different sections or regions of memory cells.

For example, one cryptographic key 145 can be representative of the privilege to have a secure command executed in the memory device 130. When the secure command is executed, an access control key 149 is installed (or uninstalled) in the memory device 130 for the validation of a verification code of another cryptographic key representative of the privilege to have a read command (or a write command) executed to access the secure memory region 133.

Optionally, the cryptographic key 145 is generated in the process of validating the identity of the memory device 130 based on the unique device secret 101 of the memory device 130; and a secret known between the memory device 130 and an owner of the memory device 130 allows the generation of a session key as the cryptographic key 145 to represent the privileges to have selected commands executed in the memory device 130 during a communication session. The communication session can have a time limit and/or be terminated via a command to the memory device 130.

In some implementations, a same session key used as the cryptographic key 145 representative of a privilege (e.g., to read or write the file system data 171 in the secure memory region 133) and as the access control key 149 for the validation of verification codes (e.g., 153) generated using the cryptographic key 145.

In another implementations, a pair of cryptographic keys of asymmetric cryptography can be used for the session. The public key in the pair is used as the access control key 149; and the private key in the pair can be used as the cryptographic key 145 representative of the corresponding privilege.

After the installation in the memory device 130 the access control key 149 for the validation of the verification codes (e.g., 153) generated using the cryptographic key 145 representative of the privilege to read or write in the secure memory region 133, the cryptographic key 145 can be used by an authorized entity to generate the signed command 163. The signed command 163 can be transmitted to the communication interface 147 of the memory device 130 by the host system 120. After the access controller 109 validates the verification code 153 in the signed command 163, the access controller 109 allows the memory device 130 to execute the command 155.

The message 143 can include data 157 that represents restrictions on the request to execute the command 155.

For example, the data 157 can include an execution count value maintained within the memory device 130 such that previously used verification codes generated with lower counts cannot be replayed and are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

Figure 3:
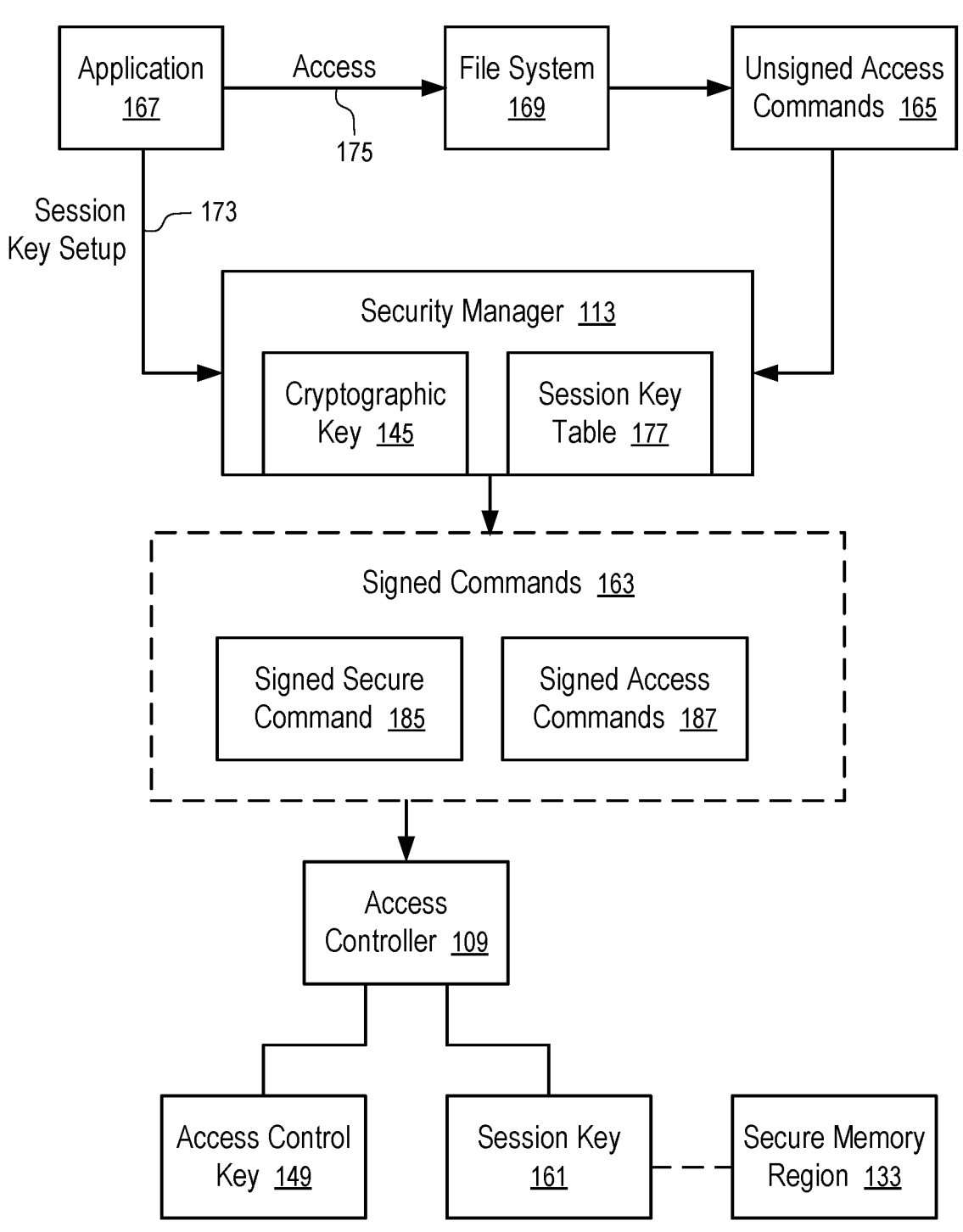
FIG. 3 shows a security manager configured to implement a session for an application to access files in a file system mounted in a memory device having access control according to one embodiment.

FIG. 3 shows a security manager 113 configured to implement a session for an application to access files in a file system 169 mounted in a memory device having access control according to one embodiment. For example, the file system 169 can be mounted in a memory device 130 of FIG. 1 having an access control technique of FIG. 2.

The file system 169 includes services provided by routines of an operating system running in the host system 120. An application 167 can call the operating system to access files in the file system 169.

In FIG. 3, the security manager 113 has a cryptographic key 145 and a session key table 177. The security manager 113 can include at least one mechanism to protect the cryptographic key 145. Such mechanisms include hiding the cryptographic key 145 in a hardware security module or on a remote computer.

The cryptographic key 145 is representative of a privilege to have secure commands executed in the memory device 130, such as a command to install a session key 161 to control access to the secure memory region 133, or to revoke the session key 161 previously installed to control access to the secure memory region 133.

In FIG. 3, an authorized application 167 can send a request to the security manager 113 for session key setup 173. Before setting up a session to facilitate access to the secure memory region 133, the operating system of the host system 120, the security manager 113, and/or, the file system 169 can be configured to validate the privilege of the application 167 to access the files hosted in the secure memory region 133.

In response to the request for session key setup 173 from the authorized application 167, the security manager 113 can issue a signed secure command 185. After the access controller 109 validates the signed secure command 185 using the access control key 149 corresponding to the cryptographic key 145, the memory device 130 executes the signed secure command 185 to install a session key 161 that controls access to the security memory region 133.

During the session key setup 173, the session key 161 (or a corresponding private session key) is stored into the session key table 177 (e.g., by the application 167 and/or by the security manager 113).

Before the session key 161 (or a corresponding private session key) is revoked from the memory device 130 and the session key table 177, the application 167 can access 175 the file system 169 to read and/or write files that are physically stored in the secure memory region 133 as the file system data 171. The file system 169, managed by the operating system running in the host system 120, can generate unsigned access commands 165. The security manager 113 uses the corresponding session keys in the session key table 177 to sign the unsigned access commands 165 to generate corresponding signed access commands 187 that can be validated using the session key 161 controlling access to the secure memory region 133 in the memory device 130. After the validation of the signed access commands 187 corresponding to the unsigned access commands 165, the corresponding file system data 171 can be read from, or written into, the secure memory region 133.

To terminate the session, the application 167 can request the security manager 113 to revoke the session key 161 in the memory device 130 and in the session key table 177.

Thus, the security manager 113 can implement a session during which the application 167 and the file system 169 can interact in a conventional way to access files that are physically hosted in a secure memory region 133 of a memory device 130 that requires access control via cryptographic keys. The security manager 113 automatically signs the commands for the file system 169 during the session, assuming that the access during the session is initiated by the application 167. The details of signed commands 163 are hidden from the application 167 and the file system 169. For example, the security manage 113 can be used to extend a conventional file system for use with the secure memory device 130 with no changes or minimum changes.

The technique of FIG. 3 enables the use of secure memory devices in privileged applications while abstracting the low-level interaction with secure memory devices, and preventing many potential security threats by greatly limiting the possibility of accessing the secure memory device by non-privileged applications.

Figure 4:
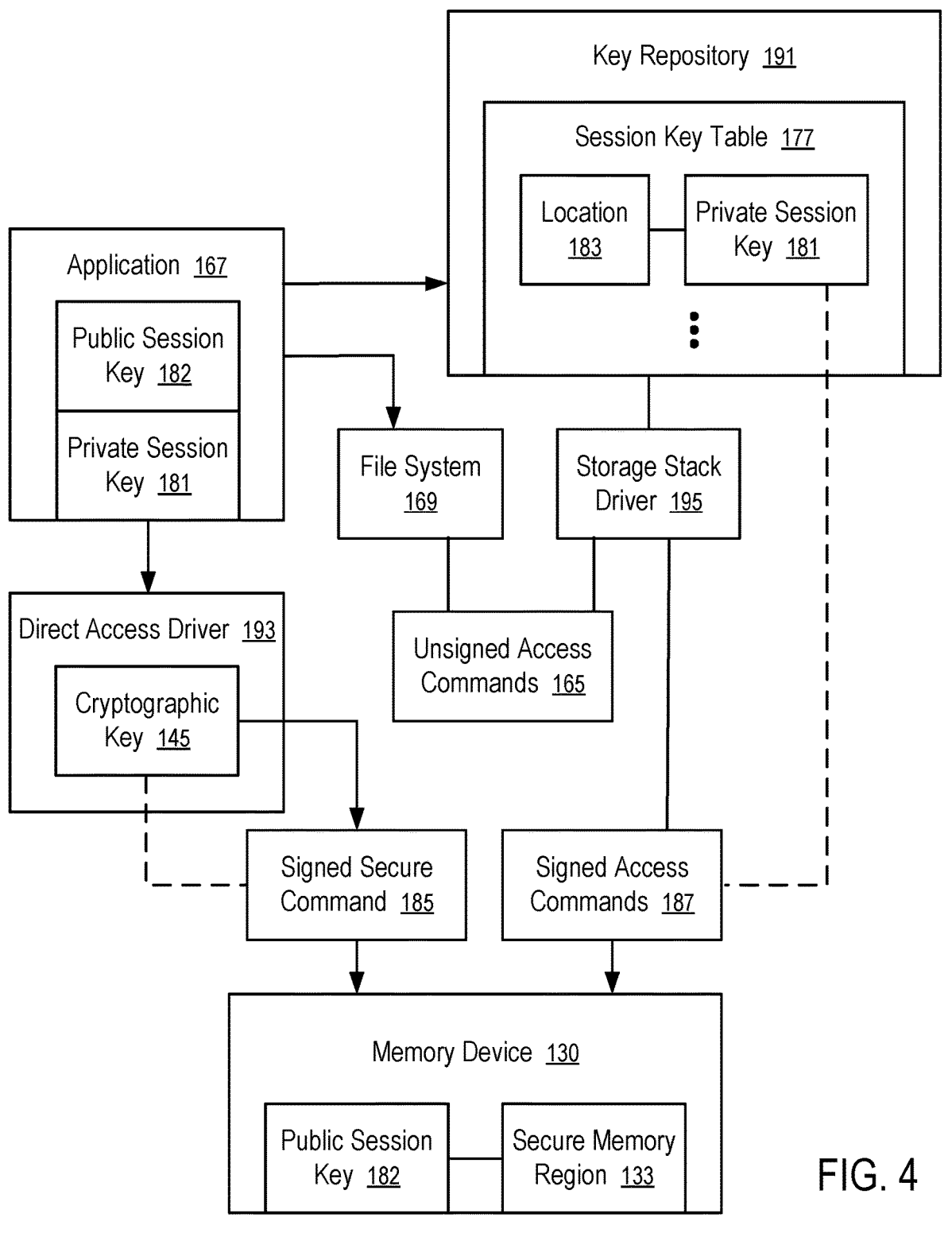
FIG. 4 shows an implementation of a security manager according to one embodiment.

FIG. 4 shows an implementation of a security manager according to one embodiment. For example, the security manager 113 of FIG. 3 can be implemented using a direct access driver 193, a storage stack driver 195, and a key repository 191 illustrated in FIG. 4.

In FIG. 4, an application having privilege to access files of a file system 169 mounted in a secure memory region 133 has a pair of a public session key 182 and a private session key 181. Once the public session key 182 is installed in the memory device 130 for the secure memory region 133, the private session key 181 is representative of the privilege to access the secure memory region 133.

To establish a session to access the secure memory region 133, the application 167 provides the public session key 182 to the direct access driver 193 and requests the direct access driver 193 to install the public session key 182 as an access control key 149 for the secure memory region 133. In response, the direct access driver 193 generates a signed secure command 185 using the cryptographic key 145 that is representative of the privilege to have a signed secure command 185 executed in the memory device 130. After the signed secure command 185 is validated by the access controller 109 of the memory device 130, the signed secure command 185 is executed in the memory device 130 to associate the public session key 182 with the secure memory region 133 such that access to read or write the secure memory region 133 can be controlled via commands signed using the corresponding private session key 181.

To enable the file system 169 to access the secure memory region, the application 167 registers the private session key 181 in the key repository 191. A session key table 177 in the key repository 191 associates the private session key 181 with the location 183 that identifies the secure memory region 133. Different secure memory regions (e.g., 133) can have different locations (e.g., 183) and thus different associated private session keys (e.g., 181).

The file system 169 is configured to access the memory device 130 using a storage stack driver 195. To read data from, or write data into, the memory device 130, the file system 169 generates unsigned access commands 165 for transmission by the storage stack driver 195. If the addresses in the access commands 165 are in the secure memory region 133, the storage stack driver 195 communicates with the key repository 19 to generate the verification codes (e.g., 153) for the read or write commands (e.g., 155) and thus generate the signed access commands 187 that can be validated using the public session key 182.

Optionally, the application 167 can request the file system 169 to provide the locations of files in the secure memory region 133 and then request the direct access driver 193 to obtain a cryptographic measure of the files stored at the locations. The application 167 can monitor the cryptographic measure of the files to detect unexpected changes that can be a result of a security attack. Countermeasures can be deployed in response to the detection of a security attack, including the revocation of active session keys in the key repository and in the secure memory device.

The direct access driver 193, the key repository 191, and the storage stack drive 195 can be implemented via instructions executed by the processing device 118 in the host system 120 and/or a special purpose logic circuit. Alternatively, the direct access driver 193, the key repository 191, and/or the storage stack drive 195 can be implemented at least in part in the memory device 130. Alternatively, or in combination, the direct access driver 193, the key repository 191, and/or the storage stack drive 195 can be implemented at least in part in a remote security server.

FIG. 5 shows a method of accessing files in a secure memory device according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the processing device 118 or controller 116 of the host system 120 in FIG. 2, the controller 115 and/or the controller 150 of a memory subsystem 110 of FIG. 6, or processing logic in the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, an operating system running in a computing system (e.g., 100 in FIG. 6) mounts a file system 169 into a memory region 133 in a memory device 130.

For example, a direct access driver 193 can be configured with a cryptographic key 145 representative a privilege to access the memory device 130. The direct access driver 193 can be used to create a partition or a namespace to host the file system 169. The operating system manages the storing of files in the storage capacity offered in the partition or the namespace. LBA addresses can be used by the file system 169 to identify storage locations of file system data 171 representative of the structure of the file system 169 and the content of files in the file system 169.

At block 303, a security manager 113 receives a request from an application 167 to open a session for the file system 169 to access the memory region 133.

For example, the security manager 113 can be implemented via a direct access driver 193, a key repository 191, and a storage stack driver 195 for the file system 169. The direct access driver 193 can receive the request for session key setup 173 from the application 167.

At block 305, the security manager transmits 113, to the memory device 130 and in response to the request, a signed secure command 185 for the session to instruct the memory device 130 to install an access control key 149 for the memory region 133 (e.g., session key 161).

For example, the storage stack driver 195 can use its privilege represented by its cryptographic key 145 to sign the secure command 185. The signing of the secure command 185 can include generating a verification code 153 from the cryptographic key 145 and a message 143 containing the command 155.

At block 307, a session key (e.g., 181) is stored, into a key repository 191.

In some implementations, the generation of a verification code and the validation of the code use a same cryptographic key. Thus, a same key can be installed in the memory device 130 as the session key 161 to control access to the memory region 133 and stored into the key repository 191 for the signing of access commands 165, such as a read command, or a write command, or any combination thereof.

In other implementations, a pair of public and private keys of asymmetric cryptography are used for the creation and validation of a verification code. Thus, a public session key 182 can be installed in the memory device 130 to control access to the secure memory region 133; and a private session key 181 can be stored into the key repository 191 for the signing of access commands 165 generated by the file system 169.

For example, the application 167 can be provided with the public session key 182 and the private session key 181 representative of a privilege to access the secure memory region 133. For example, after the security manager 113 (e.g., the direct access driver 193, the file system 169, the operating system, a security server, or another entity) determines or verifies that the application 167 is eligible to access the secure memory region 133, the public session key 182 and the private session key 181 are awarded to the application 167.

For example, the direct access driver 193 can receive the public session key 182 from the application 167 and use a signed secure command 185 to install the public session key 182 in the memory device 130 to enable access to the secure memory region 133 via the private session key 181.

For example, the application 167 can deposit the private session key 181 to enable the file system 169 and the storage stack driver 195 to access the secure memory region 133 on behalf of the application 167 and revoke or remove the private session key 181 from the key repository 191 to prevent access to the secure memory region 133 using the privilege afforded to the private session key 181 paired to the public session key 182.

For example, in response to a request for session key setup 173, the direct access driver 193 and/or the security manager 113 can verify the eligibility of the application 167 to access the secure memory region 133. After the eligibility verification, the direct access driver 193 and/or the security manager 113 can communicate with the memory device 130 to generate the public session key 182 and the private session key 181, install the public session key 182 as one of the access control keys 149 for the secure memory region 133, and provide the private session key 181 to the application 167 for use indirectly via depositing into the key repository 191.

The key repository 191 can have a session key table 177 that associates identification of locations (e.g., 183) in the memory device 130 and session keys (e.g., 181) usable to access the corresponding locations. Based on the locations (e.g., 183) being access by the access commands 165, the key repository 191 retrieves the corresponding session key (e.g., 181) to sign the access commands 165.

For example, the storage stack driver 195 can provide an access command 165 for signing by the key repository 191. Alternatively, the storage stack driver 195 can receive the session key 181 for the location 183 to be accessed in the memory device 130 and generate the signed access command 187.

At block 309, the operating system controlling the file system 169 receives calls from the application 167 to access files in the file system 169 mounted in the memory region 133.

At block 311, the file system 169 generates, responsive to the calls, access commands 165 to be transmitted to the memory device 130 to access the memory region 133.

At block 313, the security manager 113 receives (e.g., via the storage stack driver 195), from the file system 169 and during the session, the access commands 165.

At block 315, the security manager 113 communicates with the key repository 191 to generate, using the session key (e.g., 161 or 181), verification codes (e.g., 153) for the access commands 165.

At block 317, the security manager 113 transmits the access commands 165 with the verification codes 153 to the memory device 130 as signed access commands 187.

At block 319, prior to execution of the access commands 165/187 in the memory device 130, the access controller 109 of the memory device 130 using the access control key (e.g., session key 161 or 182) validates the verification codes 153 generated from the session key (e.g., 161 or 181) for the access commands 165.

For example, if the validation at block 319 is successful, the access controller 109 allows the execution of the access commands 165/187 in the memory device 130. Otherwise, signed access commands 187 having invalid verification codes 153 can be rejected or ignored.

Optionally, the application 167 can request the file system 169 to identify one or more locations in the memory region 133 at which file system data 171 is stored for the files of the application 167. The application 167 can request the direct access driver 193 to generate a cryptographic measure of the data at the locations and detect a security attack based on monitoring the cryptographic measure over a period of time. To terminate the session, the application 167 can request the key repository 191 to purge the private session key 181 deposited by the application 167 and/or request the direct access driver 193 to uninstall the public session key 182 in the memory device 130.

Figure 6:
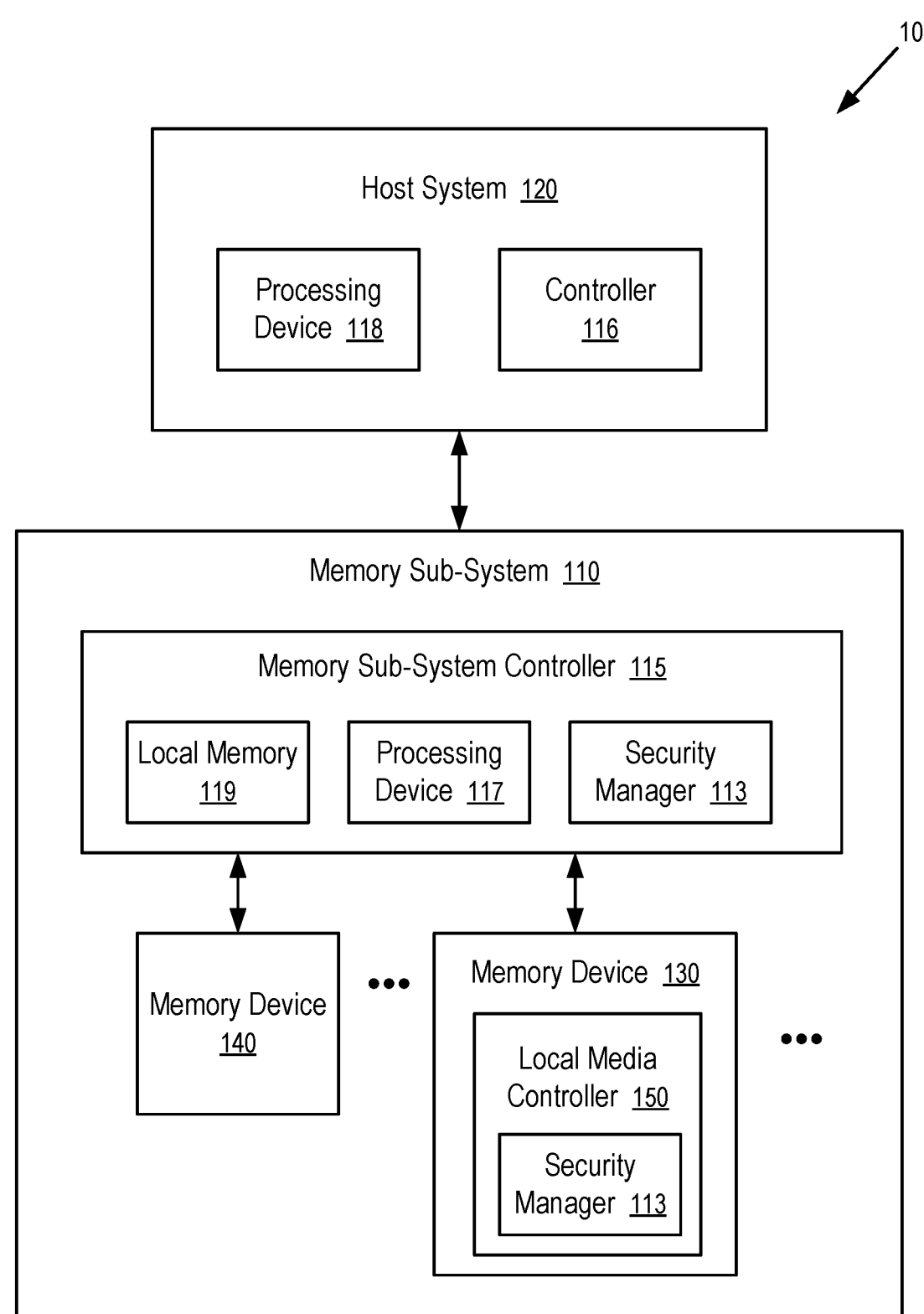
FIG. 6 illustrates an example computing system having a memory sub-system in accordance with some embodiments of the present disclosure.

FIG. 6 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 6 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 6 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 6 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 discussed above. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

Figure 7:
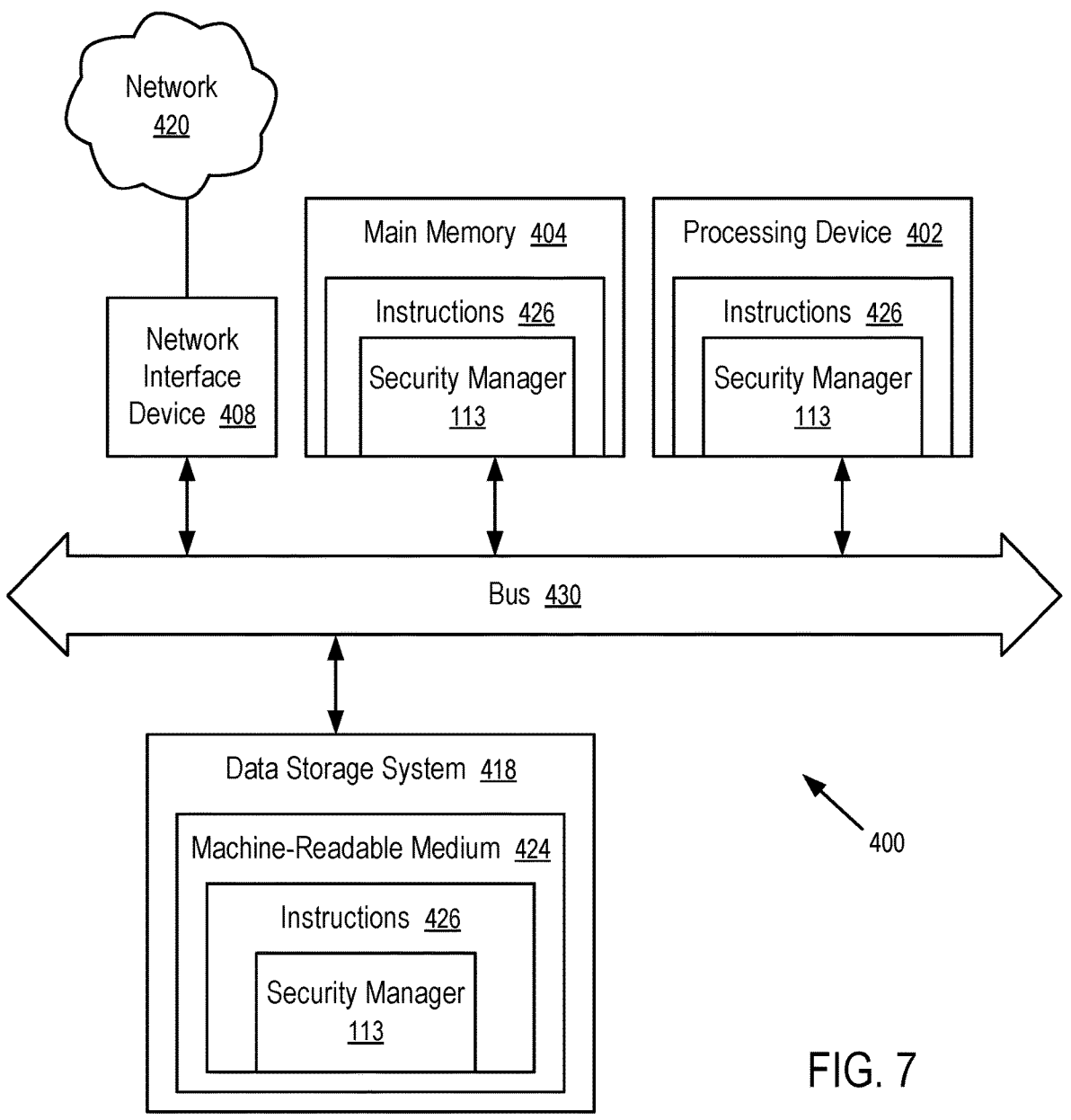
FIG. 7 is a block diagram of an example computer system in which embodiments of the present disclosure can operate.

FIG. 7 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 6) that includes, is coupled to, or utilizes a memory sub-system (e.g., the memory sub-system 110 of FIG. 6) or can be used to perform the operations of a security manager 113 (e.g., to execute instructions to perform operations corresponding to the security manager 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 6.

In one embodiment, the instructions 426 include instructions to implement functionality corresponding to a security manager 113 (e.g., the security manager 113 described with reference to FIGS. 1-5). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving a request from an application for a file system to access a memory region of a memory device;

storing, into a key repository, a session key;

receiving, from the file system, access commands to be transmitted to the memory device;

communicating with the key repository to generate verification codes for the access commands using the session key; and transmitting the access commands with the verification codes to the memory device.

2. The method of claim 1, wherein the session key and a key installed via a secure command are a pair of cryptographic keys for asymmetric cryptography.

3. The method of claim 1, wherein the session key is same as a key installed via a secure command.

4. The method of claim 1, further comprising:

generating a verification code for a secure command using a cryptographic key representative of a privilege to have the secure command executed in the memory device, wherein the secure command is transmitted to the memory device with the verification code for the secure command, and the memory device is configured with an access control key to validate the verification code prior to execution of the secure command.

5. The method of claim 4, further comprising:

receiving, from the application, a key to be installed via the secure command; and receiving, from the application, the session key to be stored into the key repository.

6. The method of claim 4, further comprising:

verifying, in response to the request, a privilege of the application to access the memory region, wherein the secure command is transmitted to the memory device in response to a determination that the application is eligible to access the memory region.

7. The method of claim 6, further comprising:

generating, in response to the request, a key to be installed via the secure command and the session key to be stored into the key repository.

8. The method of claim 4, further comprising:

receiving an identification of one or more locations in the memory region at which data of files in the file system is stored;

communicating with the memory device to generate a cryptographic measure of the data of the files.

9. The method of claim 8, further comprising:

detecting a security attack based on monitoring the cryptographic measure of the data of the files.

10. The method of claim 9, further comprising:

upon detecting the security attack based on monitoring the cryptographic measure of the data of the files, engaging in countermeasures including revocation of active session keys in the memory device.

11. The method of claim 4, wherein the session key is stored in association with a location indicator representative of the memory region; and the method further comprises:

retrieving the session key from the key repository in response to a determination that the access commands address the memory region.

12. A computing apparatus, comprising:

a memory device having memory cells and an access controller; and a host system coupled to the memory device, the host system configured to execute instructions of a direct access driver and a storage stack driver;

wherein the direct access driver is configured to receive a request from a first application to access a memory region allocated on a portion of the memory cells;

wherein the computing apparatus includes a key repository configured to receive and store a session key;

wherein the storage stack driver is configured to:

receive, from a file system, access commands to be transmitted to the memory device;

communicate with the key repository to generate, using the session key, verification codes for the access commands; and transmit the access commands with the verification codes to the memory device.

13. The computing apparatus of claim 12, wherein the access commands include a command to write data into the memory region, a command to read data from the memory region, or any combination thereof; and the first application is configured with a pair of cryptographic keys representative of a privilege to access the memory region; the pair of cryptographic keys include a private key and a public key generated via asymmetric cryptographic; and the first application is configured to provide the public key to the direct access driver for installation in the memory device via a first command transmitted by the direct access driver and store the private key into the key repository during a session.

14. The computing apparatus of claim 13, wherein the direct access driver is configured with a cryptographic key representative of a privilege to cause the memory device to execute the first command transmitted by the direct access driver to the memory device; and the memory device is configured with an access control key usable to validate a verification code generated using the cryptographic key.

15. The computing apparatus of claim 14, wherein the storage stack driver is configured to provide the access commands to the key repository to receive the verification codes generated by the key repository.

16. The computing apparatus of claim 14, wherein the storage stack driver is configured to request the key repository to provide the session key associated with the memory region and generate the verification codes from the session key and the access commands.

17. A non-transitory computer storage medium storing instructions which when, executed in a computing system having a memory device with a memory region mounted therein a file system, cause the computing system to perform a method, the method comprising:

sending a request from an application to a security manager for the file system to access the memory region;

storing, into a key repository, a session key; and calling an operating system running in the computing system to access files in the file system, wherein the file system generates, in response to the calling, access commands, and wherein the security manager is configured to communicate with the key repository to generate verification codes for the access commands using the session key and transmitting the access commands with the verification codes to the memory device.

18. The non-transitory computer storage medium of claim 17, wherein an access control key is same as the session key.

19. The non-transitory computer storage medium of claim 17, wherein an access control key and the session key are a pair of cryptographic keys of asymmetric cryptography.

20. The non-transitory computer storage medium of claim 19, wherein the method further comprises:

obtaining, by the application, the session key as a privilege to access the memory region.

\* \* \* \* \*